Nov. 5, 1929. P. C. SCHRAPS 1,734,306
CYANIDE PROCESS OF TREATING ORES CONTAINING PRECIOUS METALS
Filed Jan. 16, 1925
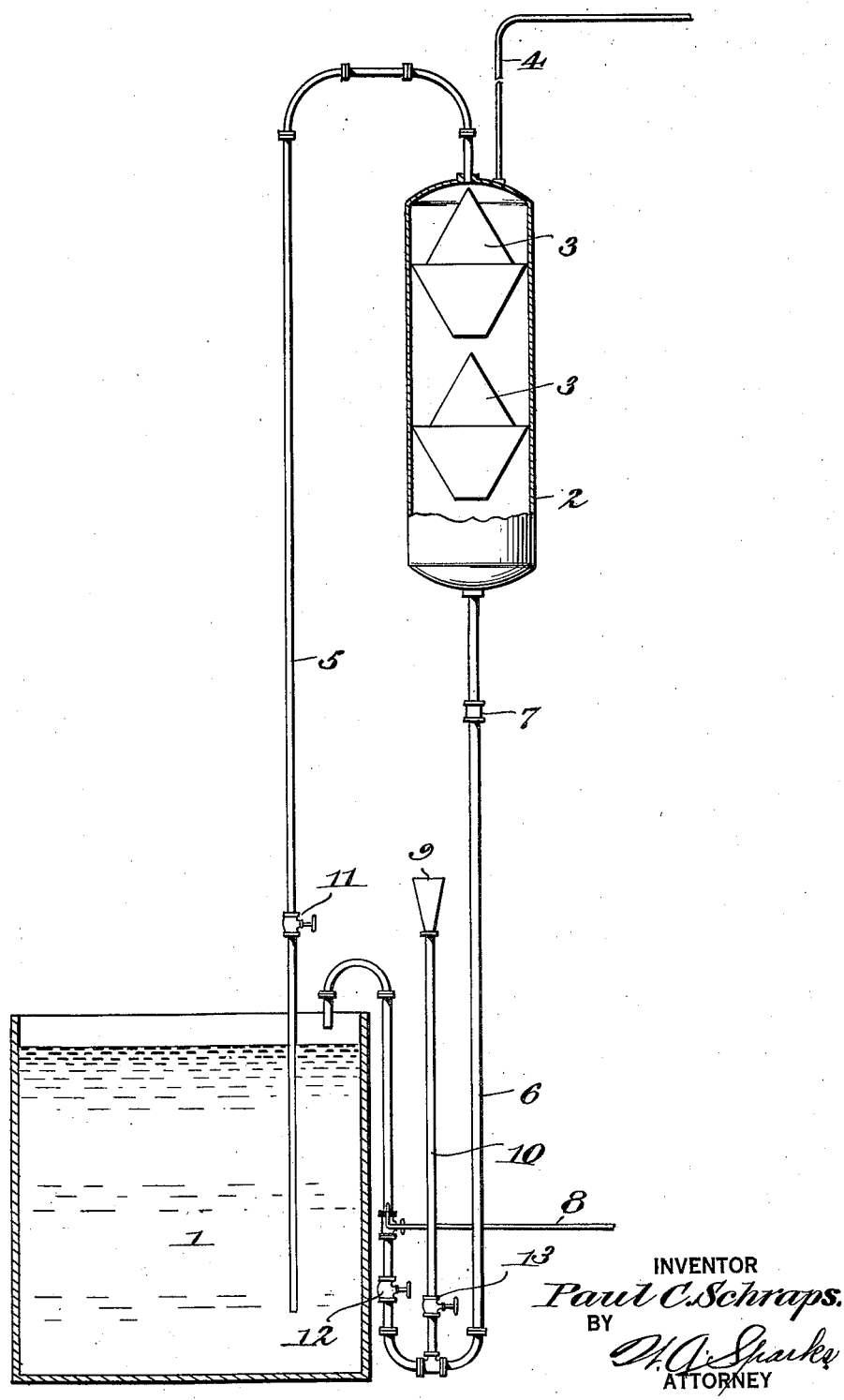
INVENTOR
Paul C. Schraps.
BY
ATTORNEY Patented Nov. 5, 1929

1,734,306

UNITED STATES PATENT OFFICE

PAUL C. SCHRAPS, OF GUAYAQUIL, ECUADOR.

CYANIDE PROCESS OF TREATING ORES CONTAINING PRECIOUS METALS

Application filed January 16, 1925. Serial No. 2,769.

This invention relates to the process of treatment of ores containing the precious metals, and one of the principal objects is to decrease the amount of cyanogen consumed in extracting a given quantity of a precious metal from its ores.

Another object is to increase the recovery of the precious metals from their ores.

Still another object of my invention is to reduce the time consumed in the treatment of the ore.

Other objects will appear as the description of the process is taken up in detail.

Broadly speaking, the invention consists of an economical and practical process of treating a mixture composed of comminuted ore of a precious metal and either water, cyanide solution, alkaline solution, or acid solution. In carrying out this process, I subject the mixture to reduced pressure thereby removing the air and other gases dissolved in the solution or otherwise present in the mixture. Oxygen in a liquid or gaseous state, in the form of an oxidizing agent or dissolved in water or in any of the above mentioned solutions or in any other desired manner is then introduced into the mixture. It is obvious that the oxygen may be introduced into the same mixture in several of the above mentioned forms, for instance as a gas, as a liquid, as an oxidizing agent and as dissolved in any of the above mentioned solutions.

In the case of the mixture of the comminuted ore with water, alkaline, or acid solution, the oxygen will partially oxidize many of the cyanide and oxygen consuming compounds in the ore far enough to render them inert in the cyanide solution later employed to extract the precious metal, and thus effect a saving in the cyanogen consumed.

The value of introducing oxygen into the cyanide solution mixture is best illustrated in connection with a sulphide of silver ore in which case the reactions may be taken as follows:—

$$Ag_2S + 4KCN = 2KAg(CN)_2 + K_2S.$$

This is a reversible reaction and cannot proceed far before reaching equilibrium, unless the $K_2S$ is removed out of the sphere of action. The $K_2S$ may be removed either by reacting with the cyanide solution or by combining with oxygen and water as shown below.

(1) $K_2S + KCN + O + H_2O = KCNS + 2KOH$
(2) $2K_2S + 2O_2 + H_2O = K_2S_2O_3 + 2KOH$
$K_2S_2O_3 + 2KOH + 2O_2 = 2K_2SO_4 + H_2O.$

It is apparent that if large quantities of oxygen can be furnished in the mixture and in an intimate relation with the particles thereof, a great saving in cyanogen can be effected. It is further evident that by the rapid removal of the $K_2S$ velocity of the reaction will be not only increased, but will be effectually prevented from reaching equilibrium and a greater extraction in a shorter time will result.

It is a well recognized fact that water or a weak cyanide solution will dissolve nearly five times as much oxygen as is contained in the air which it will dissolve. It is also well recognized that oxygen when fresh or in its nascent state is very active while the oxygen in the air or any oxygen upon standing for some time undergoes a molecular action and becomes far less active. It is therefore apparent that if water or any of the above mentioned solutions charged with fresh oxygen is introduced in the above mentioned mixtures which have been subjected to reduced pressure, the said oxygen charged solution will be forced into the most complete contact possible with the mixture of the comminuted ore and the highest efficiency in extraction results together with a great saving of cyanogen.

When oxygen is introduced as a liquid or gas or in the form of an oxidizing agent, into the mixture which have been subjected to reduced pressure a very much higher efficiency is observed owing to the removal of air and other gases such as hydrogen.

Agitation may or may not be employed with any of the above described operations as desired.

After treatment with oxygen, as above described, the extraction proceeds in the customary and usual manner.

The above described process may be effected by the use of various apparatus, and to illustrate the manner of carrying the process into effect, one form of apparatus which may be employed is illustrated in the accompanying drawing, and will now be described.

Referring particularly to the drawing, 1 represents an agitator tank, and 2 represents a vacuum receiving receptacle which is provided with any form of baffle plates such as shown at 3. At its upper end the tank 2 is connected by a pipe line 4 with any suitable vacuum pump (not shown) and by a pipe line 5 with the agitator tank 1. While the pipe 5 is shown as entering the vacuum receptacle 2 at the top, it is to be understood that this pipe might enter the receptacle at other places, and yet be within the scope of the invention.

A third pipe line 6 connects with the bottom of the vacuum receptacle 2 and after descending to about the level of the bottom of the tank 1, turns forming a U-bend and passes upwardly at the side of the tank 1, being provided at its end with a goose-neck bend so as to direct its contents into the tank 1. A check valve is inserted in the pipe line 6 at 7; and a pipe 8 is indicated as emptying into the upwardly returning portion of pipe line 6, the purpose of this pipe 8 being to conduct compressed air from a compressor (not shown) to the pipe line 6.

An oxidizing-agent feeder is indicated at 9, and is in communication with the lowest part of the U-bend in the pipe-line 6 by means of a pipe 10.

Valves in the pipe lines 5 and 6 are indicated at 11 and 12, respectively.

In operating the device thus set forth, the tank 1 is filled with the mixture, valve 11 is opened and valve 12 is closed. The pipe 10 is closed by any suitable means such as a valve 13. Air is discharged through pipe 8; and through the medium of pipe 4 there is created a partial vacuum in the tank or receptacle 2. The mixture from tank 1 is drawn ino the receiving tank 2 where air and other gases are removed from the mixture by reason of the pressure reduction. The mixture passes over the baffle plates 3 and into the pipe line 6. The valves 12 and 13 are now opened, and as the mixture passes down through the pipe line 6 the oxidizing agent is fed from the feeder 9 through pipe 10 into the stream of mixture. The compressed air from pipe 8 keeps the mixture moving through the pipe line 6, and check valve 7 prevents back flow of the mixture in the pipe line, so that the contents of the pipe are forced back into the tank 1.

While I have described one form of apparatus for carrying my invention into effect, it is to be understood that I do not limit myself to such form of apparatus, nor to anything less than the whole of my invention as herein set forth and as hereinafter claimed.

What I claim as new and desire to secure by Letters-Patent is:

1. The process of treating ores containing precious metals, which consists in removing substantially all the air and other gases from a pulp mixture of comminuted ore, introducing into the mixture a substance capable of releasing free oxygen gas, adding cyanide, and agitating.

2. The process of treating ores containing precious metals which consists in removing substantially all the air and other gases by a vacuum from a mixture of comminuted ore and water, adding an oxidizing agent to the mixture, and then adding a cyanide solution substantially saturated with oxygen, and then agitating and leaching.

3. The process of treating ores containing precious metals, which consists in removing substantially all the air and other gases from a mixture of comminuted ore and a solution by a reduction of the atmospheric pressure, introducing into the mixture a substance capable of releasing free oxygen gas, then adding a cyanide solution, and agitating and leaching.

4. The process of treating ores containing precious metals, which consists in removing substantially all the air and other gases from a mixture of comminuted ore and a cyanide solution, introducing into the mixture a substance capable of releasing free oxygen gas and treating the mixture to recover the precious metals.

5. The process of treating ores containing precious metals which consists in adding cyanide solution to the comminuted ore, removing substantially all the air and other gases from the mixture, and then adding oxygen to substantial saturation and treating the mixture to recover the precious metals.

6. The process of treating ores containing precious metals which consists in subjecting a mixture of comminuted ore and water to a pressure less than atmospheric, then adding cyanide either in the form of a solid or as a solution from which the dissolved gases have been substantially removed, then contacting the mixture of comminuted ore and cyanide solution with a substance which releases free oxygen gas when so contacted, and treating the mixture to recover the precious metals.

PAUL C. SCHRAPS.